(12) United States Patent
Pietrzak

(10) Patent No.: US 8,136,783 B2
(45) Date of Patent: Mar. 20, 2012

(54) SYSTEM FOR ASSISTING SOLAR POWER GENERATION

(75) Inventor: Arnd Pietrzak, Berlin (DE)

(73) Assignee: Solar Integrated Technologies GmbH, Mainz (DE)

( * ) Notice: Subject to any disclaimer, the term of this patent is extended or adjusted under 35 U.S.C. 154(b) by 773 days.

(21) Appl. No.: 12/140,630

(22) Filed: Jun. 17, 2008

(65) Prior Publication Data

US 2009/0151775 A1 Jun. 18, 2009

(30) Foreign Application Priority Data

Dec. 17, 2007 (DE) .................... 20 2007 017 719 U

(51) Int. Cl.
*A47G 29/00* (2006.01)
*F24J 2/38* (2006.01)
*H01L 31/00* (2006.01)

(52) U.S. Cl. ........ 248/370; 248/371; 248/126; 126/573; 126/600; 136/244

(58) Field of Classification Search .................. 248/457, 248/475.1, 476, 479, 168, 125.9, 126, 370, 248/371; 126/571–573, 578, 600, 605, 607, 126/696, 906; 136/244, 245, 246; 52/173.3
See application file for complete search history.

(56) References Cited

U.S. PATENT DOCUMENTS

| | | | | |
|---|---|---|---|---|
| 4,056,313 A * | 11/1977 | Arbogast | ..................... | 353/3 |
| 4,110,010 A * | 8/1978 | Hilton | ..................... | 359/853 |
| 4,149,523 A * | 4/1979 | Boy-Marcotte et al. | ...... | 126/589 |
| 4,297,521 A * | 10/1981 | Johnson | ..................... | 136/248 |
| 7,647,924 B2 * | 1/2010 | Hayden | ..................... | 126/600 |
| 7,888,598 B2 * | 2/2011 | Kambe | ..................... | 174/110 R |
| 2006/0044511 A1 | 3/2006 | Mackamul | | |
| 2008/0308091 A1* | 12/2008 | Corio | ..................... | 126/606 |
| 2009/0159075 A1* | 6/2009 | Mackamul | ..................... | 126/600 |

FOREIGN PATENT DOCUMENTS

DE 199 16 514 B4 11/2005
WO 2006/020597 A1 2/2006

* cited by examiner

*Primary Examiner* — Tan Le
(74) *Attorney, Agent, or Firm* — Laurence A. Greenberg; Werner H. Stemer; Ralph E. Locher

(57) ABSTRACT

A system for assisting solar power generation contains several racks for fastening power conversion modules. The racks each have a pivot axis and are mounted for pivotal movement about the pivot axis. The racks each have a lever, a movement of the lever causing a respective one of the racks to pivot. A coupling rod is provided on which the levers are each carried for rotation. The coupling rod couple the levers of the racks together and are further coupled to a linear drive unit so that the racks may be caused to pivot together through an action of the linear drive unit. A common mounting configuration mounts the racks so as to have the pivot axis carried on the common mounting configuration. The linear drive unit has a first end hinge-linked to the common mounting configuration and a second end hinge-linked to the coupling rod.

16 Claims, 6 Drawing Sheets

SYSTEM FOR ASSISTING SOLAR POWER GENERATION

CROSS-REFERENCE TO RELATED APPLICATION

This application claims the priority, under 35 U.S.C. §119, of German application DE 20 2007 017 719.4, filed Dec. 17, 2007; the prior application is herewith incorporated by reference in its entirety.

BACKGROUND OF THE INVENTION

Field of the Invention

The invention relates to a system for assisting solar power generation, containing several racks for fastening a power conversion module to each of them. Each of the racks is mounted for pivotal movement about a pivot axis and each of the racks is provided with a lever. The movement of the lever causes the rack to pivot. One drive unit and one coupling configuration is provided and through which the levers of the several racks are coupled together and coupled to the drive unit so that the racks may be caused to pivot together through the action of the drive unit.

Since ancient times, it has been known to utilize solar power. The power of electromagnetic radiation may for example be utilized in a power converting module, which is also referred to as a solar panel, to heat a fluid. The heated fluid may be used directly or run through a heat exchanger in which the heat is transferred to another fluid. The heated fluid or the heated other fluid may for example be used for heating or for driving a generator. Other power converting modules contain photovoltaic modules in which the electromagnetic solar radiation is directly converted into electric current.

For converting power, the angle of incidence of solar radiation is of paramount importance on almost all known power converting modules. Since the radiation direction changes continuously during the day, it is advantageous for the power conversion modules to track the changing direction of solar radiation.

A tracker drive system and a solar power collection system are known from international patent disclosure WO 2006/020597, corresponding to U.S. patent application publication No. US 02006/0044 511. Therein, a tracker drive system is described for rotatably driving one or more objects, the tracker drive system containing a torque element mounted for rotation about an axis. The torque element can support the one or the several objects for rotation about the axis. A lever arm is connected with the torque element, the lever arm being movable to rotate the torque element. A movable drive member that is drivable by a drive mechanism is provided. A dynamic coupler couples the drive member with the lever arm such that the lever arm is drivable by the drive member to rotate the torque element. A linear actuator is proposed as the drive mechanism. The torque elements, which may be associated each with a solar panel, are mounted on discrete foundations or on supporting mounts fastened thereon.

A solar collector and tracker configuration is known from U.S. Pat. No. 6,058,930, the tracker configuration containing at least one torsion tube that is oriented in a north-south direction and supports an array of flat rectangular solar panels. At least one pier, supported in the earth, has a pivot member in which the torsion tube is journalled. A linear actuator has a body portion mounted on a footing separate from the pier footing. The actuator includes a rod that is coupled with a lever arm on the torsion tube. The actuator can be horizontally or vertically oriented. A horizontally oriented drive may be used to drive several solar panels, a linkage mechanism connecting the lever arms of the several solar panels. The linkage mechanism can include a series of rigid link members pin-jointed to one another.

Although the known arrays and systems are capable of tracking the wandering solar radiation by pivoting several power conversion modules about an axis, it is necessary to ground separately the brackets of the discrete power conversion modules or of their pivot axes. As a result, the mounting of a solar power conversion plant involves very high construction costs. The fastening of the discrete power conversion modules constitutes in particular a problem for mounting a solar power conversion plant or a solar power generation plant.

SUMMARY OF THE INVENTION

It is accordingly an object of the invention to provide a system for assisting solar power generation which overcomes the above-mentioned disadvantages of the prior art devices of this general type, that makes it possible to mount more easily a power conversion plant with several power conversion modules.

With the foregoing and other objects in view there is provided, in accordance with the invention, a system for assisting solar power generation. The system contains several racks for fastening power conversion modules. The racks each have a pivot axis and are mounted for pivotal movement about the pivot axis. The racks each have a lever, a movement of the lever causing a respective one of the racks to pivot. A coupling rod is provided on which the levers are each carried for rotation. The coupling rod couple the levers of the racks together and are further coupled to a linear drive unit so that the racks may be caused to pivot together through an action of the linear drive unit. A common mounting configuration mounts the racks so as to have the pivot axis carried on the common mounting configuration. The linear drive unit has a first end hinge-linked to the common mounting configuration and a second end hinge-linked to the coupling rod.

According to one aspect of the invention the system, the racks are mounted so as to have their pivot axes carried on a common mounting configuration. The coupling configuration being a coupling rod on which the discrete levers are each carried for rotation and the drive unit is a linear drive unit that is hinge-linked to the common mounting configuration at one end and to the coupling rod at another end. A coupling rod is understood to refer to a rigid rod with no joints along its extension for allowing the rod to fold and/or bend. The advantage of the invention is that it provides a common mounting configuration that may be mounted and/or fastened as a whole. Thus, only one unitary footing and/or a limited number of footings is needed to support the mounting configuration at selected places. Thus, the mounting configuration is preferably implemented as a self-supporting construction, at least with the racks carried thereon. In particular in the case of a mounting configuration of a power conversion plant, the system proposed offers the advantage that the forces generated may be distributed by the mounting configuration to certain supporting points or over a large surface. By virtue of the fact that one unitary mounting configuration is used for the several racks and the power conversion modules fastened thereon, it is moreover possible to pivot the several power conversion modules about their respective axis, these axes being oriented parallel to each other, with the one drive unit that is configured to be a linear drive unit. Accordingly, only one control unit and one supply line are needed for driving and actuating the drive unit in order to cause the several power conversion modules to pivot simultaneously and in the same way. A coupling rod is a rigid elongate component part.

A preferred embodiment of the system the mounting configuration is formed of mounting profiles. It has further been found out that it is particularly advantageous to manufacture the discrete elements of the mounting configuration and/or of the rack from extruded profiles.

It has been found out that a modular construction of the mounting configuration and of the coupling rod keeps cost for manufacturing and for transportation low and is also advantageous for assembly on the site. As a result, it is possible to manufacture a system for assisting power generation, i.e., a power conversion array, of flexible size from mounting configuration modules of the same type. When transporting the small mounting configuration modules, the space needed is smaller than that of an already assembled mounting configuration.

In a preferred embodiment of the system, the mounting configuration contains at least one pair of parallel running mounting rails to which brackets are fastened or on which brackets formed, preferably angle brackets, the racks being carried each between a bracket, preferably an angle bracket, of the one mounting rail and a bracket, preferably an angle bracket, of the other mounting rail of the at least one pair of parallel running mounting rails. The mounting rails are hereby oriented at right angles to the direction of the axis about which the racks and the power conversion modules fastened thereto are pivotal. Preferably, the above-mentioned mounting configuration modules are configured so as to contain several racks for power conversion modules. A mounting configuration module preferably includes two rail elements. Preferably, each rail element includes several brackets, preferably two brackets, which are preferably configured to be angle brackets. An angle bracket is understood to refer to a bracket on which supporting forces induced at the bearing point at which the racks are carried, are transferred to supporting elements that form an angle and preferably are the legs of an angle. A triangular surface, which is fastened at a base to the mounting rail and which contains at the apex of the triangular surface opposite the base or in the region of the apex the bearing point for the axis of rotation of the rack, also constitutes an angle bracket in the sense described herein. Such type planar angle brackets are however disadvantageous with respect to wind loads so that angle brackets are preferably used, which include two separate legs that direct the supporting forces from the bearing point to different sites on the mounting rails. If forces are induced at the bearing point, for example by wind forces acting onto the power conversion module of the rack, that do not act along the bisector of the angle formed by the two legs of the angle bracket, tensile forces occur in the one leg and compression forces, in the other leg. These forces are introduced into the same mounting rail at the different sites or regions spaced apart at which the respective legs are fastened to the mounting rail. Generally, by using angle brackets and one unitary mounting configuration, it is ensured that the occurring forces are introduced more evenly into the footing or footings.

On a modular construction, the mounting rails and/or the coupling rods are preferably composed of rail elements or of coupling rod elements. In one embodiment, they are configured such that they contain ends that may be plugged into each other. Therefore they each contain one end for receiving an element of the same type and another end that may be plugged into another element of the same type. In other embodiments the ends of the rail elements or coupling rod elements are all configured in the same way for receiving connecting elements that stiffen the mounting rails or the coupling rod, respectively and wherein the commenting elements are preferably locked by bolts and/or screws that are plugged and/or screwed through the ends of the rail elements or coupling rod elements and the connecting elements at right angles to the direction in which the rails or the coupling rod extend. Thus, the rail elements and/or the coupling rod elements are preferably removably connected together. As a result, it is possible to readily dismount/convert a system, for example in the event of maintenance work on a roof construction that lies underneath in case of an on-roof installation.

In order to increase the stiffness of the mounting configuration in some embodiments of the invention the mounting configuration contains connecting crossties for stiffening the mounting configuration. These connecting crossties preferably connect the two parallel mounting rails and/or the brackets (angle brackets) of various mounting rails and/or the mounting rails with a bracket (angle bracket) of the opposite mounting rail. On other embodiments, these connecting crossties are missing.

The discrete modules of the mounting configuration preferably include two rail elements to which preferably several, most preferably two, brackets, preferably angle brackets, are fastened. Additionally, a mounting configuration module may contain one or several connecting crossties. Further, a corresponding coupling rod element is associated with the mounting configuration module. Several, most preferably two, racks may be pivotally carried on each mounting configuration module, the racks being capable of receiving two power conversion modules. Naturally, depending on the dimensions of the racks, more than two angle brackets (brackets) may be fastened for each rail element.

While the mounting configuration is preferably oriented such that the pivot axes are oriented parallel to a north-south direction, it is advantageous for best power yield as a function of the geographic latitude to additionally tilt the pivot axes with respect to a horizontal. As a result, it is achieved that, at least at one moment in time, for example, when the sunlight comes from the south (in our case, the system has been mounted on the northern hemisphere), the solar radiation strikes the power conversion modules as far as practicable at a specified angle of incidence. Preferably, the angle is optimized such that the best possible power conversion is achieved for the corresponding geographic situation of the mounting site of the system, taking into consideration the pivotal movement of the power conversion modules about the pivot axis during the course of the day. In order to tilt the pivot axis in one embodiment of the invention, that brackets (angle brackets) of the two parallel mounting rails of the at least one pair are configured such that the bearing points of the pivot axes on the brackets (angle brackets) of the one mounting rail are spaced a smaller distance apart from the mounting rail than the bearing points on the brackets (angle brackets) of the other mounting rail are spaced from the other mounting rail. Therefore the bearing points of the brackets (angle brackets) fastened to the one mounting rail are all spaced the same although different distance from the mounting rail or from its supporting surface than the bearing points on the brackets (angle brackets) of the other mounting rail. It is understood that such an embodiment may also be implemented with brackets that are no angle brackets. If one assumes that the supporting surface of the mounting rails is horizontal, small brackets or angle brackets are fastened to the one mounting rail and large brackets or large angle brackets are fastened to the other mounting rail. Accordingly, the racks are carried between a large angle bracket (large bracket) that is preferably oriented toward the north, and a small angle bracket (small bracket), that is preferably turned toward the south (on the northern hemisphere).

In one embodiment of the invention in which the pivot axis is tilted about an axis of rotation extending parallel to the direction in which the mounting rails extend, there is preferably provided that a plane spanned by the legs of the angle brackets (or a plane defined by the brackets) contains an angle other than 90° with respect to a supporting surface of the at least two parallel mounting rails. The angle brackets or brackets that are fastened to a mounting rail accordingly have an angle other than 90° with respect to a supporting surface of the one mounting rail, if one assumes again that the supporting surface is horizontal.

The levers through which the discrete racks are pivoted are preferably configured to be hinged angled bars the two leg ends of which are each fastened to the racks at a distance from and symmetrical to the pivot axis, the hinged angled bars being each fastened to the coupling rod in the region of an apex in a rotatable fashion. When pivoting the rack by causing the coupling rod to perform a linear movement, pressure forces are introduced into the rack through one leg and tensile forces through the other leg. As a result, the force is optimally distributed for the pivotal movement to happen.

The racks each contain an elongate axis tube that extends parallel to the pivot axis and, at each of the opposite ends of the axis tube, two carrier arms (rack arms) cantilevered transverse to the pivot axis to which the power conversion modules may be fastened. Other embodiments may provide for further carrier arms or rack arms cantilevered transverse to the pivot axis. The power conversion modules are preferably configured to be level and flat.

In the case of a larger sized power conversion plant, it has been found advantageous that the mounting configuration includes several pairs of mounting rails arranged parallel to each other and between which racks are rotatably carried, wherein a coupling rod oriented parallel to the mounting rails exists for each pair of the mounting rails, the coupling rods of the several pairs being mechanically coupled in such a manner that the drive drives all the coupling rods together and causes all the racks to tilt in the same way.

In a preferred embodiment, a control unit for actuating the drive unit is provided for tilting. Operation of the drive unit may be time-controlled and/or controlled by evaluating sensor signals. With embodiments in which several pairs of mounting rails are provided, each of them having a drive unit of its own disposed thereon, these drive units may be actuated together through a common control unit.

Accordingly, in one embodiment optical sensors are provided for detecting a solar radiation direction and/or intensity, the measured signal of which is evaluated by the control unit in order to pivot the racks so as to obtain the best possible power yield from the incident solar radiation with the power conversion modules.

In a preferred embodiment of the system, the system includes power conversion modules that are preferably photovoltaic modules.

Other features which are considered as characteristic for the invention are set forth in the appended claims.

Although the invention is illustrated and described herein as embodied in a system for assisting solar power generation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
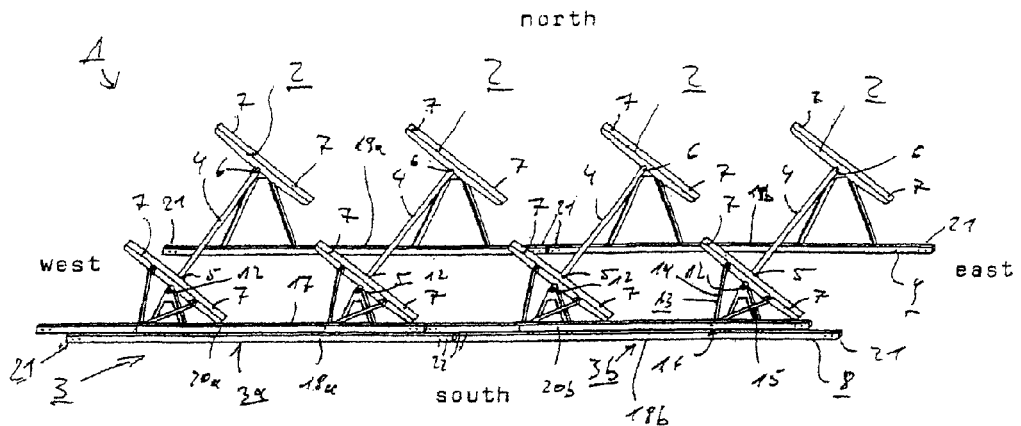
FIGS. 1A-1C are diagrammatic, perspective views of a system for assisting solar power generation in various pivoted conditions, in the morning, at noon and in the afternoon according to the invention.
Figure 1B:
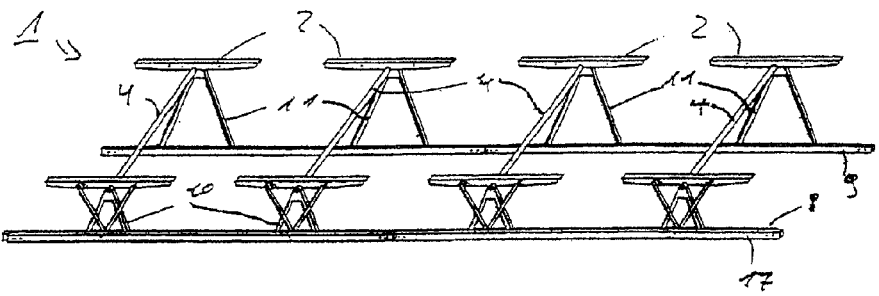
Figure 1C:
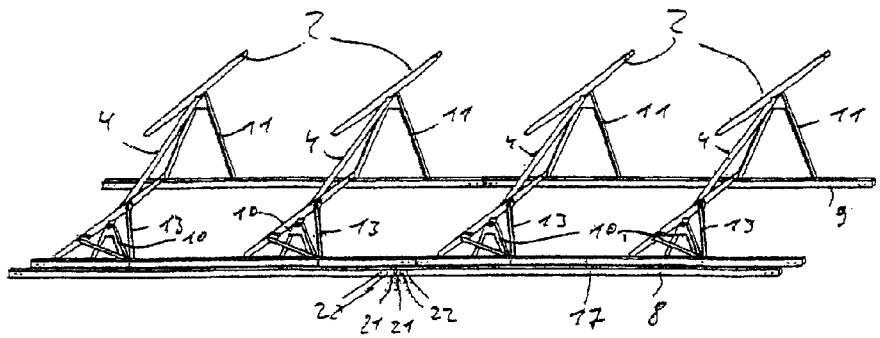

Referring now to the figures of the drawing in detail and first, particularly, to FIG. 1A-1C thereof, there is shown a system 1 for assisting solar power generation in different pivoted conditions. In the embodiment shown, the system 1 for assisting solar power generation includes four racks 2 to which non-illustrated power conversion modules such as photovoltaic modules can be fastened. The several racks 2 are each pivotally carried on a common mounting configuration 3. They are carried such that pivot axes 4, which are here configured to be axis tubes, are oriented to be parallel to each other. Herein after, the term pivot axis will also be used as a synonym for the axis tubes. For those skilled in the art, it appears that the racks 2 may be configured such that there is no element embodying the "entire pivot axis" but only, for example, journals formed in the neighborhood of bearing points, concentric with the pivot axis, on the pivot axis. A general orientation of the pivot axes 4 is chosen to be parallel to a north-south direction. At their opposite ends, i.e., at a proximal end 5 and at a distal end 6, the pivot axes 4 each have carrier arms 7 extending transverse to the direction in which the pivot axis 4 extends, the arms 7 being also referred to as rack arms 7. A power conversion module such as a non-illustrated photovoltaic module may be fastened such as screwed to the carrier arms 7.

The mounting configuration 3 contains a mounting rail 8 and another mounting rail 9 that are facing each other so as to form a pair. They are oriented in an east-west-direction so that the pivot axes 4 are oriented in north-south direction. On the one mounting rail 8, small angle brackets 10 are fastened or formed. On the other mounting rail 9, large angle brackets 11 are fastened or formed. Each rack 2 is pivotally mounted for rotation between the small angle bracket 10 and the large angle bracket 11. Bearing points 12 of the pivot axes 4 on the small angle brackets are spaced a smaller distance from the one mounting rail 8 or from its supporting surface than bearing points (not labelled) of the pivot axis 4 on the large angle brackets 11 of the other mounting rail 9 or its supporting surface. As a result, the pivot axis 4 is tilted with respect to a horizontal if one assumes that the one mounting rail 8 and the other mounting rail 9 rest on a horizontal surface.

On the carrier arms 7, which extend laterally from the proximal end 5 of the pivot axis 4, there are fastened hinged angled bars 13. Each hinged angled bar 13 includes two legs 14, 15 that are attached or fastened to the carrier arms 7 at a distance from the pivot axis 4 and symmetrical to the pivot axis 4. At an apex 16 of the hinged angled bar 13, it is fastened to a coupling rod 17 in a rotatable fashion. The coupling rod 17 is oriented to be parallel to the one mounting rail 8 and to the other mounting rail 9. The racks 2 may be pivoted about the pivot axis 4 via the hinged angled bar 13 through a movement of the coupling rod 17 that is performed substantially linearly in east-west direction. FIG. 1A shows a position of the system 1 in the morning, when the sun shines onto the earth from the east. FIG. 1B shows the position the system 1 adopts at noon when the sun is in the south (on the northern hemisphere). FIG. 1C shows the position of the system in the afternoon or in the evening when the sun sets in the west. In addition to the movement from the west to the east, the coupling rod 17 lowers until the horizontal orientation of the racks 2 in FIG. 1B is reached. Then, the distance separating the coupling rod from an underground increases again while the coupling rod 17 continues to move in the west-east direction.

For reasons of clarity, the schematic representations shown in FIGS. 1A-1C neither show a drive unit nor usually provided crossbars between the one mounting rail 8 and the other mounting rail 9 and/or the small angle brackets 10 and/or the large angle brackets 11. The system 1 shown in FIGS. 1A through 1C contains a mounting configuration 3 of a modular construction. It is formed of two mounting configuration modules 3a and 3b. Each mounting configuration module 3a, 3b is provided for receiving two racks 2. Accordingly, the one mounting rail 8 contains two rail elements 18a, 18b, each containing two small angle brackets 10. The other mounting rail 9 contains two rail elements 19a, 19b, each containing two large angle brackets 11. Likewise, the coupling rod 17 is also assembled out of coupling rod elements 20a and 20b. In the illustrated embodiment, the rail elements 18a, 18b, 19a, 19b and the coupling rod elements 20a, 20b each contain, in proximity to their ends 21, two through holes 22. The rail elements 18a, 18b, 19a, 19b and the coupling rod elements 20a, 20b are preferably configured to be mounting profiles, most preferably extruded profiles. At least at their ends, they are configured such that link elements can engage into the ends and be immobilized via fixing elements such as pins, bolts, . . . and so on (not shown). The fixing elements are guided through the through holes 22 for stiffening the mounting rails 8, 9 and the coupling rod 17.

Figure 2:
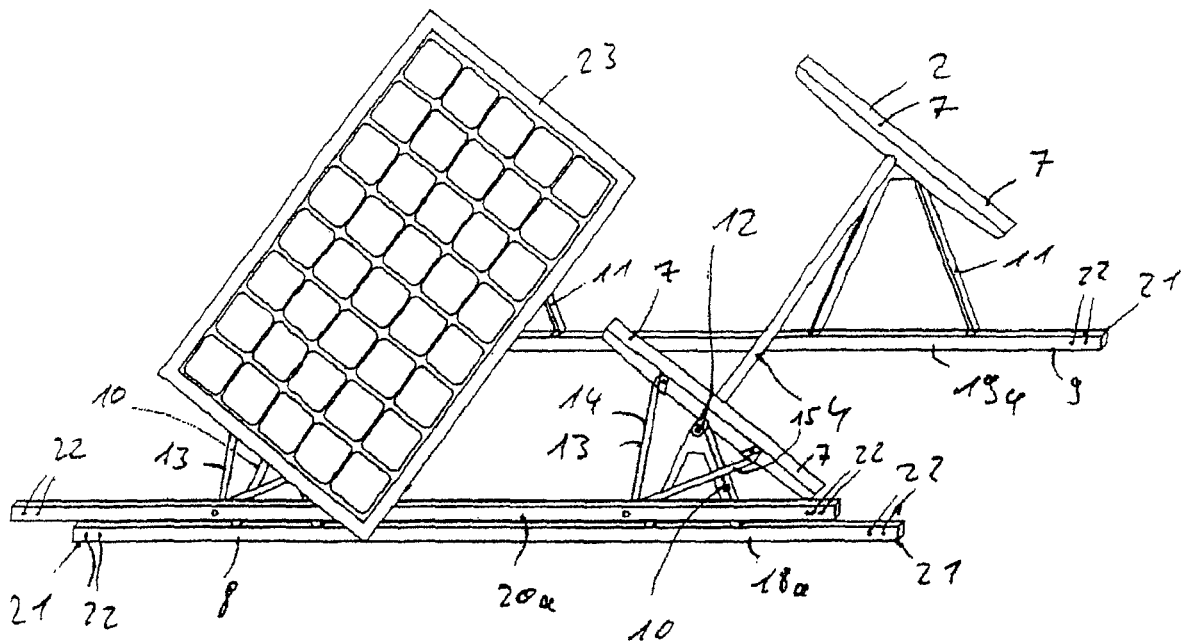
FIG. 2 is a diagrammatic, detail perspective view of a system module.

FIG. 2 schematically shows one single mounting configuration module 3a of the system 1 shown in FIG. 1. On the left hand side the power conversion module 23, which is a photovoltaic module, is fastened on the rack 2. The spacing between the racks 2 or between the small and the large angle brackets 10, 11, respectively, is chosen to achieve that the least possible shading, if possible no shading at all, occurs between the discrete power conversion modules 23 in the pivoted condition in a specified portion of the day, in particular in the morning and/or in the evening.

Figure 3:
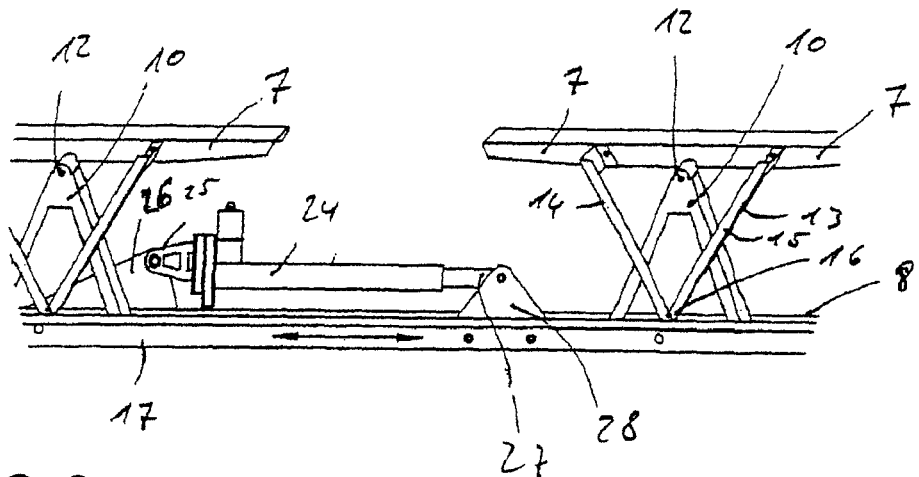
FIG. 3 is a diagrammatic, detail perspective view of the drive unit.

FIG. 3 schematically shows how a drive unit 24 is linked to the coupling rod 17 to cause the racks 2 and the power conversion modules 23 fastened thereto to pivot. At one end 25, the drive unit 24 is rotatably carried on the one mounting rail 8 or on a bracket 26 fastened thereto. At an opposite end 27, the drive unit 24, which is a linear drive unit, is rotatably fastened to the coupling rod 17 or to a fastening bracket 28 solidly connected to the coupling rod 17. In the event of a linear movement upon operating the drive unit 24 the opposite end 27 travels relative to the one end 25, whereby the coupling rod 17 is caused to perform a linear movement which in turn causes the racks 2 to pivot via the hinged angled bars 13. Beside the substantially linear movement, the coupling rod 17 also performs at right angles to the linear movement an up and down movement which is due to the rotatable mounting of the coupling rod 17 on the hinged angled bars 13 which in turn are rotatably supported for rotation on the small angle brackets 10 via the racks 2. What matters is that the drive unit 24 is (rotatably) hinge-linked at the one end 25 to the mounting configuration, preferably to the one mounting rail, or to a component part solidly connected thereto and that, at the opposition end 27, it is (rotatably) hinge-linked to the coupling rod 17. The drive unit 24 is not separately supported by a footing. Advantageously, the drive unit 24 is fastened to the one mounting rail 8, in proximity to a center thereof. It is apparent that the drive unit 24 can also be fastened to the other mounting rail if the hinged angled bars are disposed in the neighbourhood of the brackets (angle brackets) of said other mounting rail.

Figure 4:
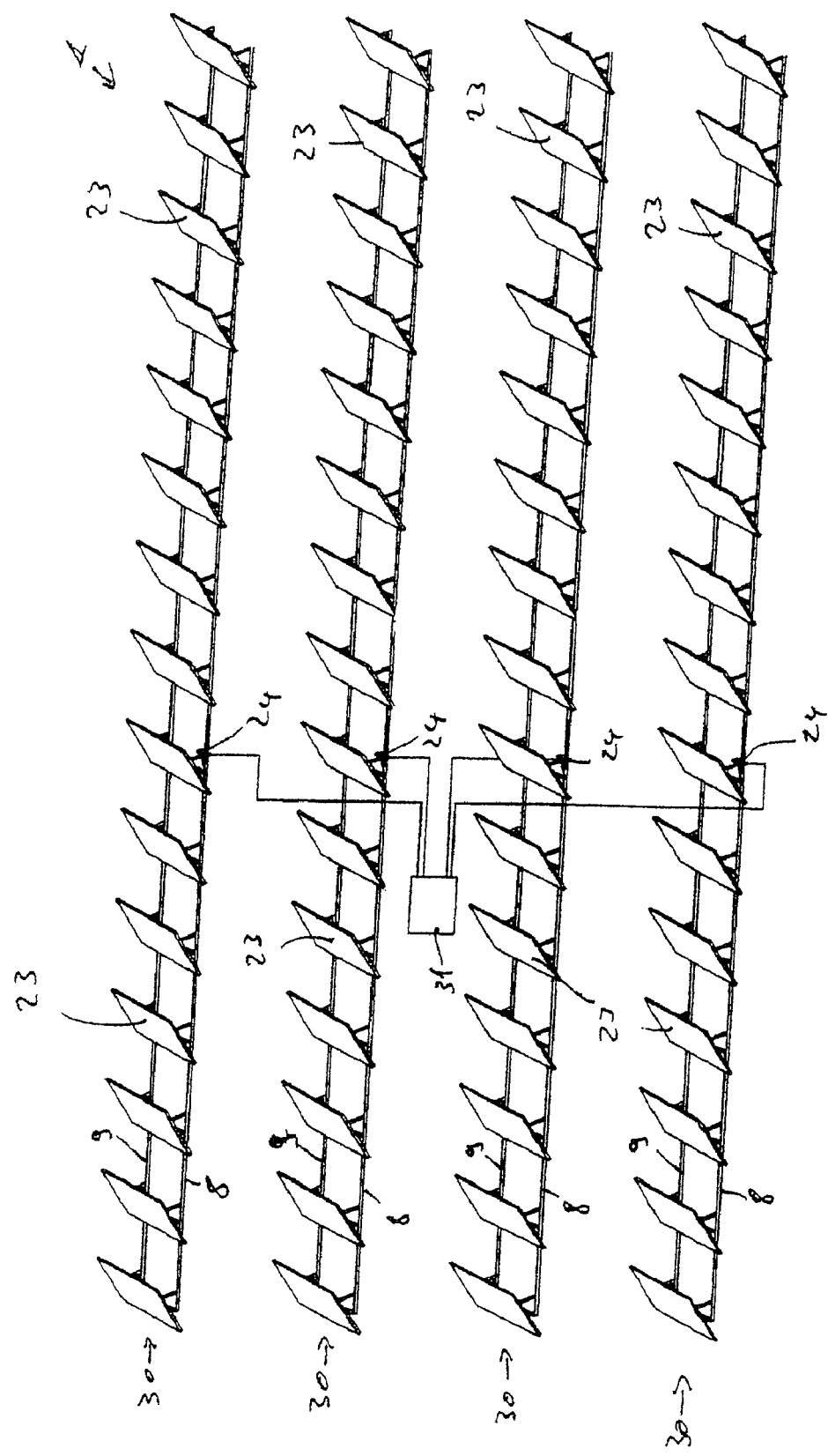
FIG. 4 is a diagrammatic, perspective view of a system that includes several pairs of mounting rails disposed parallel to each other, one drive being associated with each pair.

FIG. 4 schematically shows the system 1 for assisting solar power conversion that contains several pairs 30 of mounting rails 8, 9 and of racks 2 carried thereon with the power conversion modules 23 fastened thereto, the mounting rails 8, 9 being disposed parallel to each other. The discrete pairs 30 of mounting rails 8, 9 each contain their own drive unit 24 to drive the corresponding coupling rods 17 and to pivot the racks 2 or the power conversion modules 23 fastened thereto during the course of the day. In the embodiment shown, the drive units 24 are driven via a central control unit 31. The control unit 31 can be configured to be time-controlled, which means that a pivoted position depends on the time of the day and the season. Other embodiments may provide for sensors disposed on discrete racks and/or on the mounting frame for measuring the direction and/or the intensity of solar radiation. The control unit 31 may be configured to evaluate the signals of these sensors and to optimize the orientation of the racks accordingly. Additionally, further sensors may be provided, which measure other environmental impacts such as the speed of the wind, the direction of the wind, the temperature, and so on. These parameters can be taken into consideration for control. In the event of strong east-west winds, it may for example be advantageous to orient the racks in a largely horizontal orientation as it is for example adopted at noon in order to minimize the wind loads acting on the mounting configuration and the racks.

Figure 5:
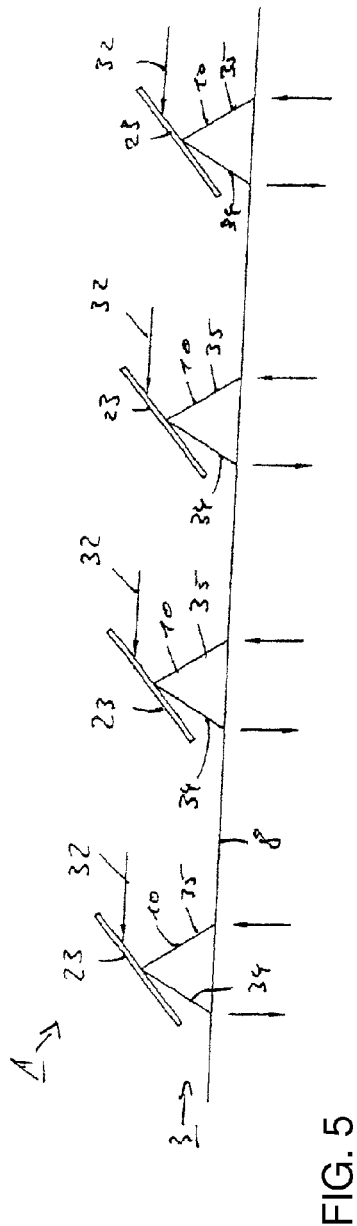
FIG. 5 is diagrammatic view of a system for assisting solar power generation with angle brackets for improved absorption of wind loads.

FIG. 5 is intended to illustrate the advantage of providing for angle brackets in particular in the event of wind loads. Wind 32 acting from the east onto the system results in a pressure force experienced by legs 34 turned away from the wind and which is being introduced by these legs 34 into the mounting rails 8, 9 while the other legs 35 experience a tensile force and introduce it into the mounting rails 8, 9 at a distance from the point at which the legs 34 induce their force. Generally, the force distribution over the mounting configuration is improved as a result thereof.

Figure 6:
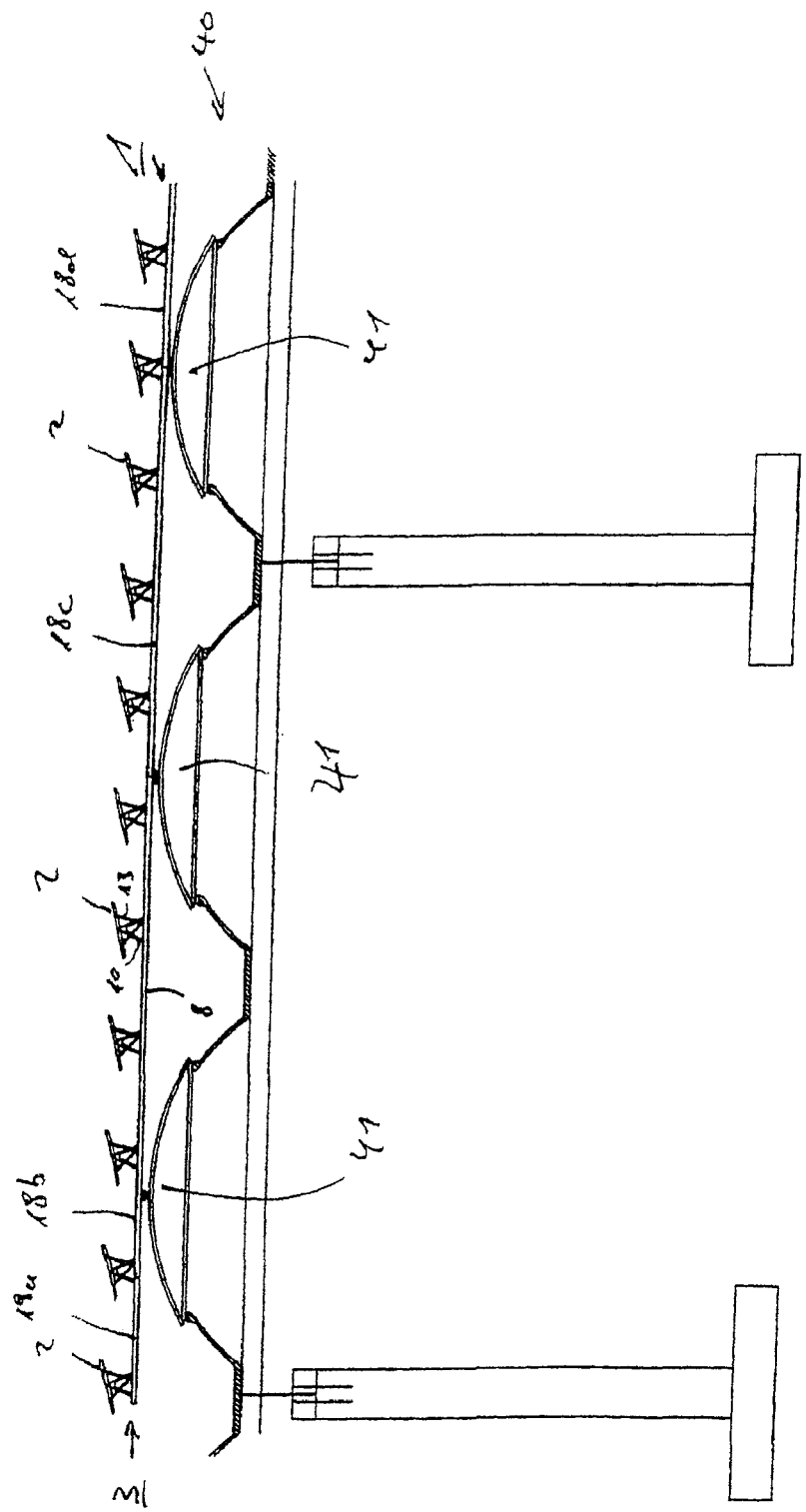
FIG. 6 is a diagrammatic view of a domed roof on which there is disposed the system for assisting solar power generation.

FIG. 6 schematically shows how such a system may be advantageously disposed on a domed roof 40. By virtue of the common mounting configuration 3, it is possible to span various domes 41 of the domed roof 40. The entire system 1 must only be supported at discrete points. Such an embodiment is particularly suited for factory and industrial buildings that often have domed roofs or the like. Although such a power generating system shadows direct solar radiation, stray light still shines through the system 1 so that windows disposed in the roof construction can still be used for illuminating the rooms underneath. As compared to a comparable power generation system using non-pivotal power conversion modules, the incidence of light is increased over a non-pivotal system since a surface of the power conversion modules can be reduced at same power yield. Moreover, a vertical projection surface of the power conversion modules is further reduced in the pivoted state (i.e., in the not horizontally oriented condition) so that the area available for incident stray light is still further increased.

Figure 7:
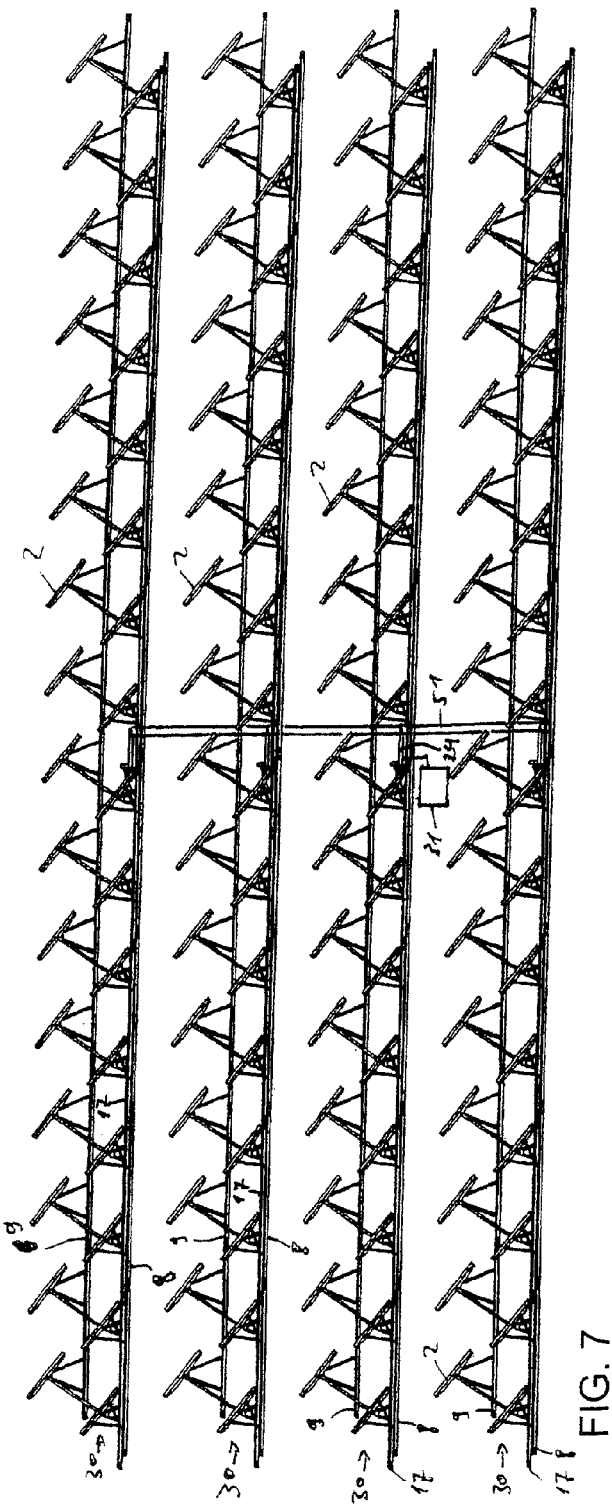
FIG. 7 is a diagrammatic view of the system for assisting solar power generation with several pairs of mounting rails disposed parallel to each other in which the coupling rods are driven all together by a single drive.

FIG. 7 shows another embodiment of a system for assisting solar power generation in which again several pairs 30 of parallel running mounting rails are provided. The pairs contain racks carried on angle brackets disposed on the mounting rails. In this embodiment, only one drive unit is provided, which drives the coupling rods 17 of all of the pairs 30 of mounting rails 8, 9. For this purpose, the discrete coupling rods 17 are mechanically coupled. For this purpose, a rigid transverse coupling rod 51 configured to be transverse to the coupling rods 17 couples the discrete coupling rods 17.

Figure 8:
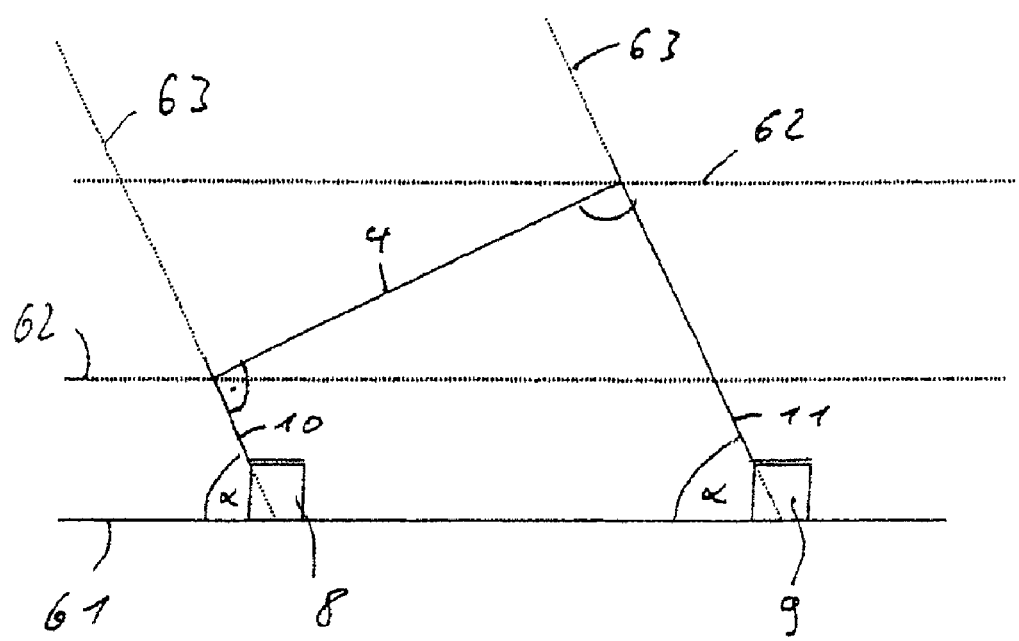
FIG. 8 is a diagrammatic view of an embodiment of the system for assisting solar power conversion in which the brackets are inclined at an angle different from 90° with respect to a horizontal supporting surface of the mounting configuration.

FIG. 8 schematically outlines how the plane spanned by the discrete small angle brackets 10 or the large angle brackets 11 or by the legs 34, 35 of an angle bracket 10, 11 is inclined at an angle a different from 90° with respect to a supporting surface 61 of a corresponding mounting rail in order to favor the pivotal movement of the pivot axis 4 with respect to horizontal 62. If a plane 63 spanned by the angle brackets is tilted with respect to a 90° orientation to the supporting surface, the pivot axis 4 may be oriented 90° with respect to the plane of the angle brackets. As a result, the formation or insertion of the bearing for the pivot axis 4 into the angle brackets 10, 11 are strongly simplified.

The embodiments illustrated are strongly simplified schematic illustrations. More specifically, transverse crossbars (connecting cross ties) between the mounting rails and/or the mounting rails and the angle brackets and/or between the angle brackets are not shown. These serve for stiffening the mounting configuration. For those skilled in the art, other advantageous embodiments of the invention may be envisaged, which differ from the schematic embodiments described herein.

The invention claimed is:

1. A system for assisting solar power generation, the system comprising:
several racks for fastening a power conversion module to each of said racks, said racks each having a pivot axis and being mounted for pivotal movement about said pivot axis, said racks each having a lever, a movement of said lever causing a respective one of said racks to pivot;
a linear drive unit;
a coupling rod on which said levers are each carried for rotation, said coupling rod coupling said levers of said racks together and further coupled to said linear drive unit so that said racks may be caused to pivot together through an action of said linear drive unit;
a common mounting configuration mounting said racks so as to have said pivot axis carried on said common mounting configuration, said common mounting configuration containing brackets and at least one pair of parallel running mounting rails fastened to said brackets or on which said brackets are formed;
said linear drive unit having a first end hinge-linked to said common mounting configuration and a second end hinge-linked to said coupling rod; and
said racks being carried each between said brackets of a first of said mounting rails or another one of said brackets of a second of said mounting rails of said at least one pair of parallel running mounting rails.

2. The system according to claim 1, wherein said common mounting configuration has mounting profiles.

3. The system according to claim 1, wherein at least one of said common mounting configuration and said racks is made from extruded profiles.

4. The system according to claim 1, wherein said common mounting configuration and said coupling rod are of a modular construction.

5. The system according to claim 1, wherein at least one of said mounting rails and said coupling rods are assembled out of one of rail elements and coupling rod elements, each having ends that can be plugged into each other.

6. The system according to claim 5, wherein at least one of said rail elements and said coupling rod elements are removably connected together.

7. The system according to claim 1, wherein said common mounting configuration has connecting crossties for stiffening said common mounting configuration between at least one of said brackets and said mounting rails.

8. The system according to claim 1, wherein said brackets of said pair of parallel mounting rails are configured such that bearing points of said pivot axes on said brackets of said first mounting rail are spaced a smaller distance apart from said first mounting rail than the bearing points on said brackets of said second mounting rail are spaced from said second mounting rail.

9. The system according to claim 8, wherein said brackets of at least one of said first mounting rail and said second mounting rail are angle brackets.

10. The system according to claim 9, wherein:
said mounting rails each have a supporting surface; and
said angle brackets have legs and a plane spanned by said legs of said angle brackets is inclined at an angle a different from 90° with respect to said supporting surface of said mounting rails.

11. The system according to claim 1, wherein said levers are hinged angled bars having two leg ends which are each fastened to said racks at a distance from and symmetrical to said pivot axis, said hinged angled bars each having an apex and each being fastened to said coupling rod in a region of said apex in a rotatable fashion.

12. The system according to claim 1, wherein said racks each include an elongate axis tube that extends parallel to said pivot axis and, at each of opposite ends of said elongate axis tube, two carrier arms cantilevered transverse to said pivot axis to which the power conversion modules are to be fastened.

13. The system according to claim 1, wherein said common mounting configuration includes several pairs of said mounting rails disposed parallel to each other and between which said racks are rotatably carried, wherein said coupling rod oriented parallel to said mounting rails exists for each pair of said mounting rails, said coupling rods of said several pairs being mechanically coupled such that said linear drive unit drives all said coupling rods together and causes all said racks to tilt in a same way.

14. The system according to claim 1, further comprising a control unit connected to and actuating said linear drive unit.

15. The system according to claim 14, further comprising optical sensors for detecting at least one of a radiation direction and a radiation intensity of rays of a sun, said optical sensors connected to said control unit and outputting measured signals evaluated by said control unit for pivoting said racks so as to obtain a best possible power yield from incident solar radiation with the power conversion modules.

16. The system according to claim 1, wherein the system includes the power conversion modules and said power conversion modules are photovoltaic modules.

\* \* \* \* \*